(12) United States Patent
Swartz

(10) Patent No.: US 6,896,520 B2
(45) Date of Patent: May 24, 2005

(54) SYSTEM AND METHOD FOR ENCOURAGING AN UNDERSTANDING OF VISUAL ART

(75) Inventor: Claudia Swartz, Paradise Valley, AZ (US)

(73) Assignee: Artapalooza, LLC., Paradise Valley, AZ (US)

(*) Notice: Subject to any disclaimer, the term of this patent is extended or adjusted under 35 U.S.C. 154(b) by 31 days.

(21) Appl. No.: 10/256,815

(22) Filed: Sep. 27, 2002

(65) Prior Publication Data

US 2004/0063077 A1 Apr. 1, 2004

(51) Int. Cl.[7] .............................................. G09B 11/00
(52) U.S. Cl. ...................................... 434/81; 40/124.01
(58) Field of Search .............................. 434/81, 84, 98; 283/75, 91; 40/124.191, 124.01

(56) References Cited

U.S. PATENT DOCUMENTS 5,270,101 A * 12/1993 Helicher ..................... 428/209
2002/0043764 A1 * 4/2002 Imhof ......................... 273/292

OTHER PUBLICATIONS www.solsuite.com.*
www.newtscards.com.*
www.essentialart.com.*
www.slvjh.slv.k12.ca.us.*
www.isd.net.*
www.bostin.com, article by Ben Bornstein.*
www.csu.edu.au/australia/flag.*
www.talariaenterprises.com, Art Memo Game.*
www.crizmac.com, Impressionist Art Game.*
www.serenapowers.com/leormand.html.*

* cited by examiner

Primary Examiner—Derris H. Banks
Assistant Examiner—Jamila Williams
(74) Attorney, Agent, or Firm—Jordan M. Meschkow; Lowell W. Gresham; Meschkow & Gresham, P.L.C.

(57) ABSTRACT

A system for encouraging an understanding of visual art includes a set of collectible cards (20, 36, 38, 40, 42). Each of the cards (20, 36, 38, 40, 42) includes an image (26) of an artwork on a first side (22) of the card. Information pertaining to the artwork is provided on a second side (24) of the card. The information is in the form of stylized brushstrokes (30), color codes (52), text, and icons. Through the use of the stylized brushstrokes (30), color codes (52), text, and icons, a method is thus provided for collecting and organizing the images.

11 Claims, 4 Drawing Sheets

SYSTEM AND METHOD FOR ENCOURAGING AN UNDERSTANDING OF VISUAL ART

TECHNICAL FIELD OF THE INVENTION

The present invention relates to the field of education. More specifically, the present invention relates to an educational system and method for encouraging an understanding of visual art.

BACKGROUND OF THE INVENTION

Art may be generally defined as works produced through the conscious use of skill and creative imagination, especially in the creation of aesthetic objects. In a broad sense, art appreciation is the introduction of the basic principles of visual literacy—especially the fundamentals of formal analysis without reference to subject matter, symbolism, or historical context—to general audiences for the purpose of enhancing their enjoyment of works of art.

Visual art is artwork, such as paintings, drawings, photography, or sculptures, which appeals primarily to the visual sense and typically exists in permanent form. Learning about the visual arts gives students an appreciation of the world around them, teaching them about their own history and culture, as well as those of other people. Moreover, in a world in which ideas and information are often delivered visually, students need to learn how to analyze and judge the meaning of images and how to use them to communicate their own ideas.

The principles of visual literacy, i.e., the ability to recognize and understand ideas conveyed through visible actions or images (as pictures), are typically taught by studying masterpieces created by master artists. A masterpiece may be thought of as a work of art, craftsmanship, or writing universally recognized as embodying the highest skill of a great master or group of masters. A master refers to an artist, writer, composer, or craftsman who consistently creates works of the highest quality (i.e., masterpieces).

The study of the master works of art, i.e., masterpieces, can facilitate a student's understanding of how techniques have been applied in the past. This gives students an appreciation of how previous masters have overcome various technical problems to express their creativity more fully. Consequently, by studying the masterpieces, students are encouraged to think critically, solve problems creatively, make evaluations, and appreciate different points of view.

Currently, many study techniques for learning about art involve the rote memorization of facts and the regurgitation of the facts, techniques, and methods. Unfortunately, rote memorization can be quite arduous, thus leading to the discouragement of, rather than encouragement of, an appreciation for the arts. Thus, what is needed is an innovative approach for encouraging students to gain an understanding of art, and to commit facts about art and artists to long-term memory.

SUMMARY OF THE INVENTION

Accordingly, it is an advantage of the present invention that a system and method are provided for encouraging an understanding of visual art.

It is another advantage of the present invention that a system and method are provided that aids a student in learning about artworks and the artists who created them.

Another advantage of the present invention is that a system and method are provided that enhances an ability to memorize facts pertaining to the artworks and artists.

Yet another advantage of the present invention is that a system and method are provided that facilitate the understanding of artworks by capitalizing on an individual's desire to collect objects.

The above and other advantages of the present invention are carried out in one form by a system for encouraging an understanding of visual art. The system comprises a set of cards, each of the cards including an image of an artwork and an emblem representing an art movement into which the artwork is categorized.

The above and other advantages of the present invention are carried out in another form by a method of organizing images depicting artworks for encouraging an understanding of visual art. The method calls for imprinting each of the images onto separate cards. For each of the cards, the method further calls for marking the card with stylized brushstrokes representing an art movement into which one of the artworks depicted by the image is categorized.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
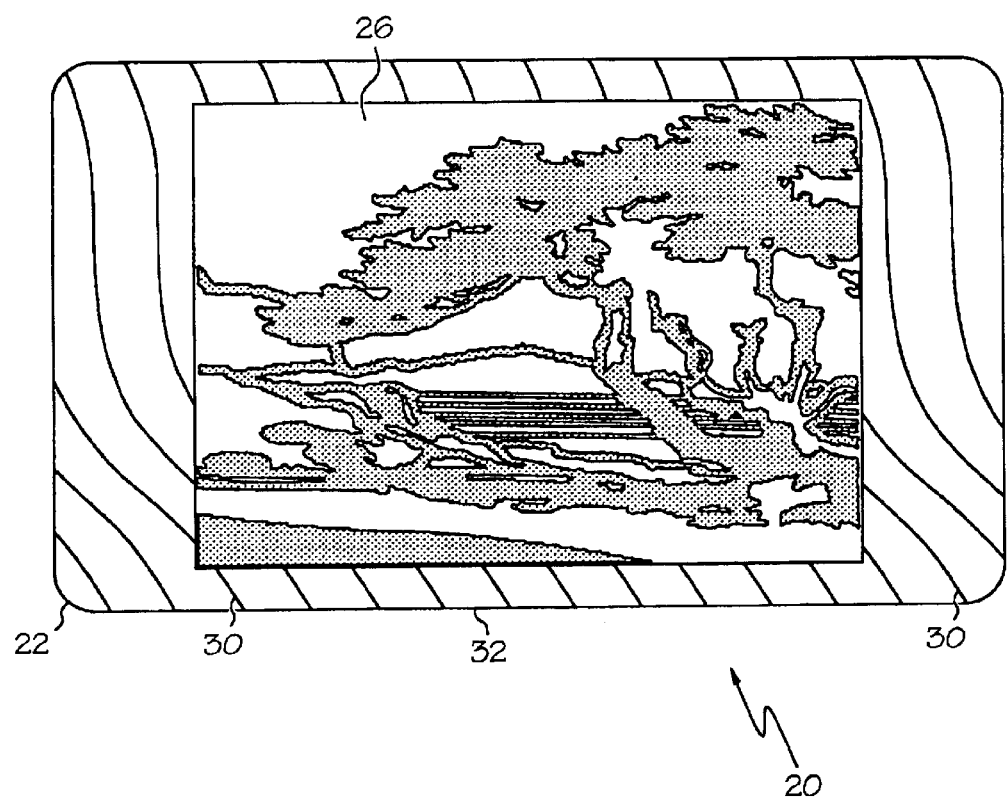
FIG. 1 shows a front view of a card within a system of cards in accordance with a preferred embodiment of the present invention.
Figure 2:
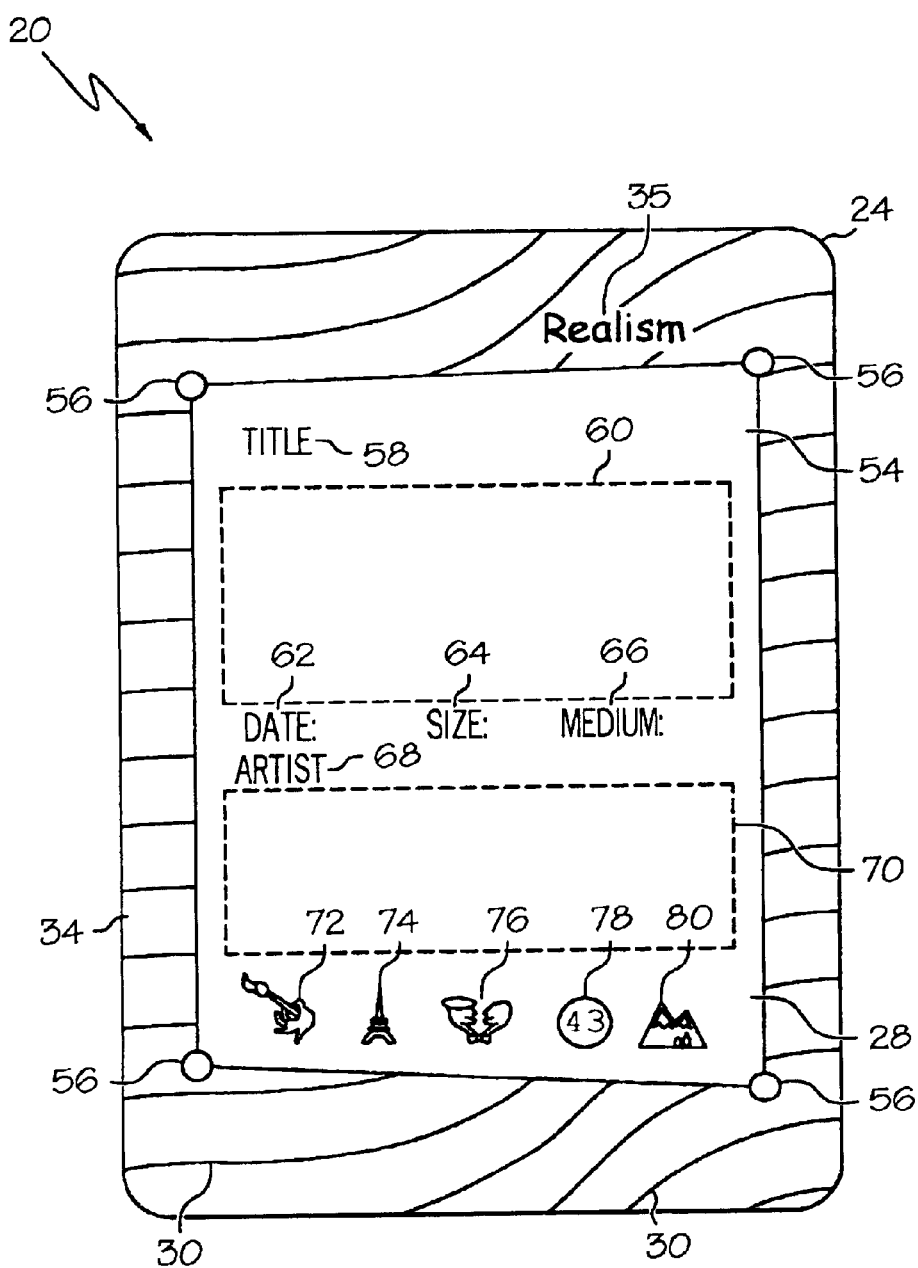
FIG. 2 shows a back view of the card of FIG. 1 in accordance with the preferred embodiment of the present invention.

Referring to FIGS. 1–2, FIG. 1 shows a front view of a card 20 within a system of cards, and FIG. 2 shows a back view of card 20 in accordance with a preferred embodiment of the present invention. Card 20 includes a first side 22 and a second side 24. An image 26 depicting an artwork is imprinted on first side 22, and a placard section 28 is imprinted on second side 24. The system of the present invention includes a set of cards, such as card 20, each of the cards within the set being different. That is, each of the cards includes a different image 26 of an artwork. A student may purchase, trade, or otherwise collect the cards in order to eventually obtain all of the different cards.

In a preferred embodiment, the artwork depicted by image 26 is one of the visual arts, such as, a painting, a drawing, a photograph, or a sculpture. However, those skilled in the art will recognize that other images may be employed on cards 20 in accordance with a different subject matter.

Furthermore, in the preferred embodiment, image 26 depicts a masterpiece, i.e., a work of art universally recognized as embodying the highest skill of a master artist. Such master artists may be, for example, Cézanne, Michelangelo, van Gogh, Monet, Renior, and so forth. However, it should be apparent to those skilled in the art that the artwork need not be one of those termed as a "masterpiece", but rather may include more obscure works of art.

An emblem, in the form of stylized brushstrokes 30, is located in a frame 32 about a perimeter of image 26. Likewise, stylized brushstrokes 30 are located in a frame 34 about a perimeter of placard section 28. Stylized brushstrokes 30 represent an art movement into which the artwork of image 26 is categorized. For example, brushstrokes 30 represent a realism art movement 35. The term "art movement" refers to a tendency or trend in art, and results from a group of artists who agree on general principles. In the visual arts, art movements include, for example, Renaissance, Romanticism, Realism, Impressionism, Post-Impressionism, Cubism, Expressionism, and so forth. In a preferred embodiment, brushstrokes 30 represent the technique of the individual art movement.

Figure 3:
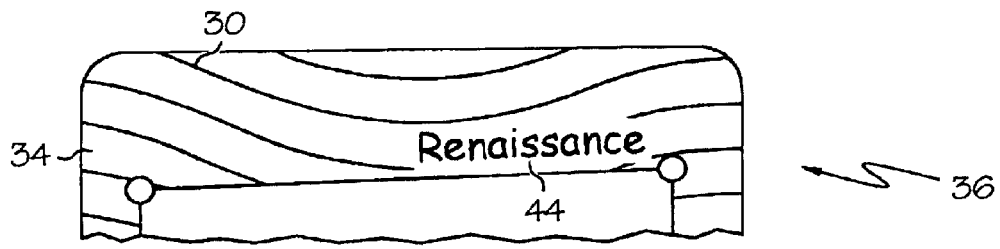
FIG. 3 shows a partial back view of a second card of the system of cards.
Figure 4:
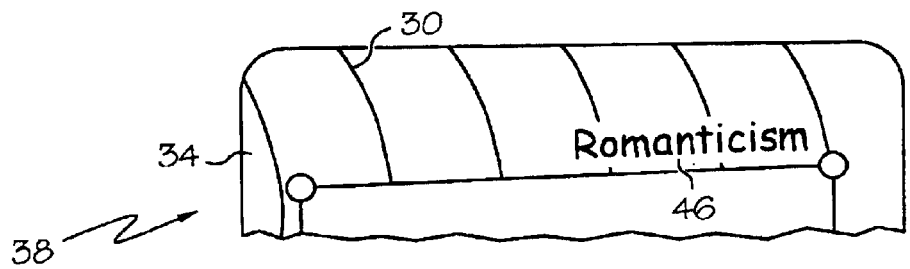
FIG. 4 shows a partial back view of a third card of the system of cards.
Figure 5:
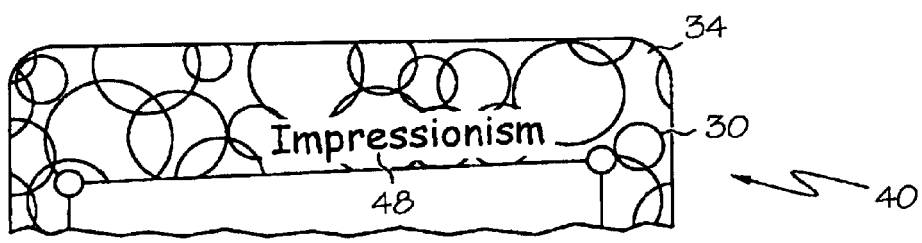
FIG. 5 shows a partial back view of a fourth card of the system of cards.
Figure 6:
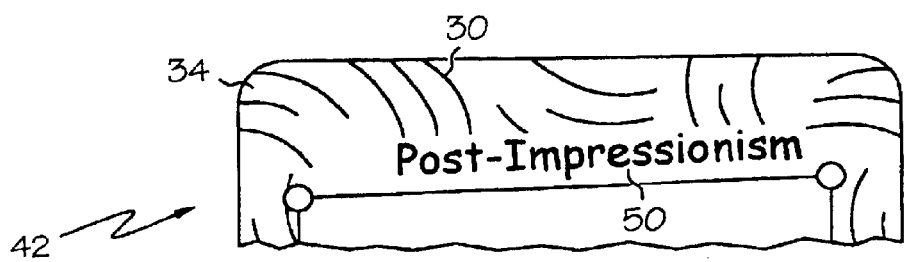
FIG. 6 shows a partial back view of a fifth card of the system of cards.

Referring to FIGS. 3–5, FIG. 3 shows a partial back view of a second card 36 of the system of cards. FIG. 4 shows a partial back view of a third card 38 of the system of cards. FIG. 5 shows a partial back view of a fourth card 40, and FIG. 6 shows a partial back view of a fifth card 42 of the system of cards.

Each of second, third, fourth, and fifth cards 36, 38, 40, and 42, respectively, includes brushstrokes 30 representing different art movements. For example, second card 36 includes generally horizontally sweeping brushstrokes 30 that represent a renaissance art movement 44. Third card 38 includes generally vertically sweeping brushstrokes 30 that represent a romanticism art movement 46. Likewise, fourth card 40 includes circular brushstrokes 30 representing an impressionism art movement 48, and fifth card 42 includes fragmented brushstrokes 30 representing a post-impressionism art movement 50.

Brushstrokes 30 provided on each of first side 22 and second side 24 provide a readily distinguishable means for differentiating between the different art movements. Brushstrokes 30 aid a student in remembering how each art movement is different and similar. For example, the techniques used during the renaissance and realism art movements were similar. As such, respective stylized brushstrokes 30 representing realism art movement 35 and renaissance art movement 44 are similar, but not identical.

Figure 7:
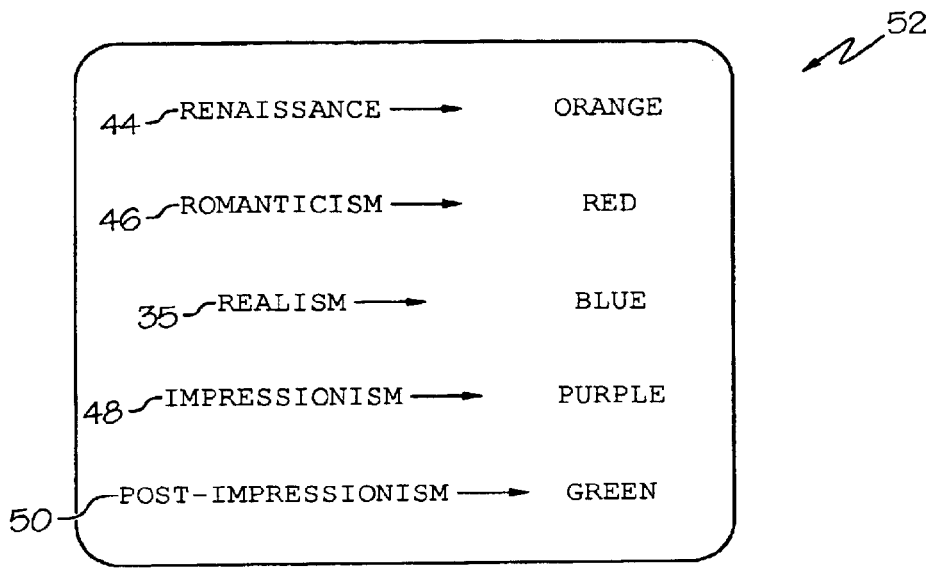
FIG. 7 shows a chart of color codes for the cards of FIGS. 1 and 3–6 that represent particular art movements.

FIG. 7 shows a chart of color codes 52 for cards 20, 36, 38, 40, and 42 that represent particular art movements. Each of cards 20, 36, 38, 40, and 42 is color coded to correspond with the particular art movement to which the artwork depicted by image 26 belongs. For example, artworks categorized as being in impressionism art movement 48 is indicated with purple, while artwork categorized within renaissance art movement 44 is indicated with orange.

In a preferred embodiment, frame 32 about a perimeter of image 26 is black, gray, or some other neutral color. The neutral color about image 26 serves to draw one's attention to image 26 rather than to frame 32. However, frame 34 about a perimeter of placard section 28 on second side 24 is shaded with one of color codes 52. Like brushstrokes 30, color codes 52 provide a readily distinguishable means for differentiating between the different art movements. Moreover, color codes 52 may be utilized as an organizational aid for sorting a collection of the cards.

Referring back to FIG. 2, placard section 28 is a generally trapezoidal text box 54. Circular images 56 are located at each corner of trapezoidal text box 54. Circular images 56 represent tacks, thus giving placard section 28 a "posted" or tacked up appearance. The rounded corners and the appearance of placard section 28 of cards 20, 36, 38, 40, and 42 give the cards a pleasing look, as well as make the cards comfortable to hold.

Placard section 28 includes information pertaining to the artwork depicted in image 26. The information includes, for example, a title 58 of the artwork and a first information set 60 having text describing the artwork. In addition, the information may include a date 62 that the artwork was created, dimensions 64 of the artwork, and/or a medium 66 in which the artwork was created.

The text within first information set 60 may describe the artwork and/or the technique used. In addition, the text desirably piques a student's interest and encourages the student to analyze and judge the meaning of image 26 by providing mental stimulus for further thought. Such text may include, for example, "Can you imagine this painting if it were done at a different time of day?" or "What time of year do you think it is?"

Placard section 28 further includes information describing the artist of the artwork depicted in image 26. The information includes, for example, a name 68 of the artist and a second information set 70 having text describing the artist. The information may also include a pronunciation key for name 68, and birth and death years of the artist. Second information set 70 includes text that desirably piques a student's interest about the artist. Such test may describe the technique the artist used, what influenced the artist's style, and/or what the artist was best known for.

A set of icons is arranged along a bottom edge of placard section 28. The icons are symbols that add information about each artist's life. The facts symbolized by the icons are entertaining to reference and to compare. In addition, through the use of the icons the facts about the artists are easier to memorize.

In an exemplary embodiment, a first icon 72 represents a medium with which the artist of the artwork depicted in image 26 typically worked. A second icon 74 represents a nationality of the artist. A third icon 76 represents a training technique used by the artist. A fourth icon 78 represents the age of the artist when the artwork was generated, and a fifth icon 80 represents an art style for which the artist was known. Those skilled in the art will recognize that other icons may be generated that are relevant to other facts about the artist.

Figure 8:
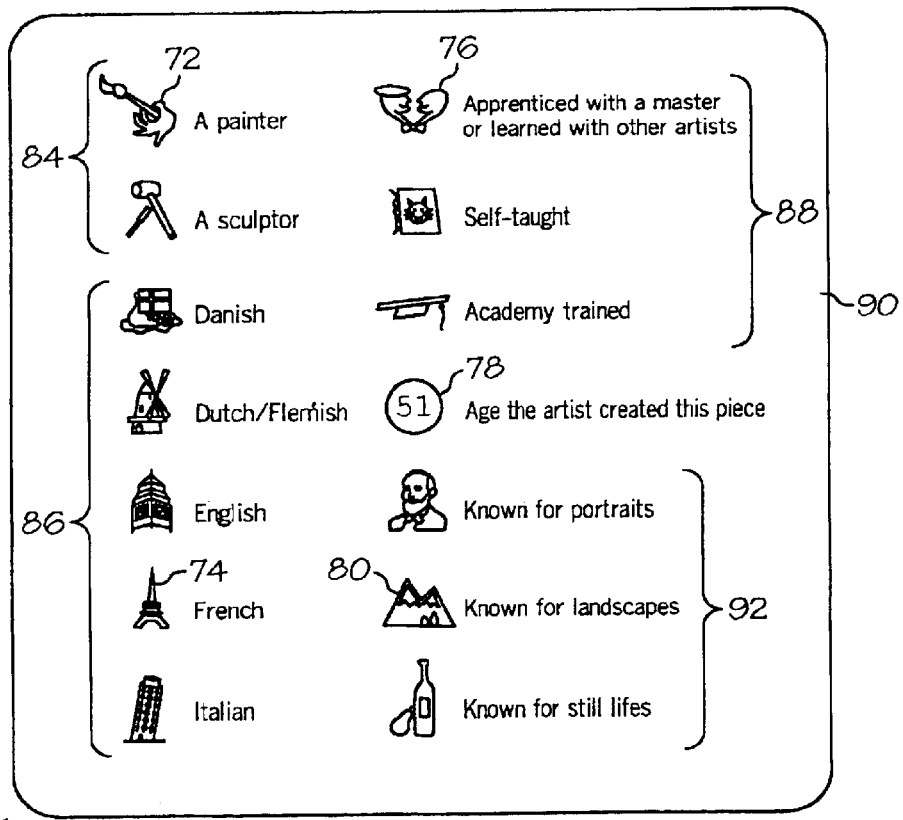
FIG. 8 shows a chart of icons utilized on the cards of FIGS. 1, and 3–6.

FIG. 8 shows a chart of exemplary icons 82 utilized on the cards of FIGS. 1 and 3–6. For example, a first group of icons 84 includes symbols for various mediums. A second group of icons 86 includes symbols for various nationalities. A third group of icons 88 includes symbols for various training techniques. An icon 90 is shown that symbolizes the age of the artist, and a fourth group of icons 92 includes symbols for various art styles. The symbols are shown in FIG. 8 are intuitive, humorous, and eye-catching, thus, making the facts associated with the symbols easier to remember.

In accordance with the information presented above, a method of organizing images depicting artworks entails imprinting images of artworks onto one side of separate cards. Information pertaining to the artworks is imprinted on the opposite side of the cards. Each of the cards is subsequently marked with stylized brushstrokes 30 (FIG. 1) and shaded with a color code. Stylized brushstrokes 30 and the color code represent the art movement into which the artworks are categorized. Accordingly, the cards may be organized in accordance with the art movement into which the artworks are categorized. The cards may be further organized in accordance with icons that provide facts about the artist of the artwork. The cards may then be provided as a randomly packaged set, each of the cards of the set having a different image imprinted thereon. The various features of the cards make the art history more memorable and entertaining, and capitalize on an individual's desire to collect objects.

In summary, the present invention teaches of a system and method for encouraging an understanding of visual art. The system includes a set of collectible cards, each having an image of an artwork. Information in the form of stylized brushstrokes, color codes, text, and icons aids a student in learning about artworks and the artists who created them. Moreover, the organization of the brushstrokes, color codes, text, and icons enhances a student's ability to memorize facts pertaining to the artworks and artists, and encourages an appreciation of art.

Although the preferred embodiments of the invention have been illustrated and described in detail, it will be readily apparent to those skilled in the art that various modifications may be made therein without departing from the spirit of the invention or from the scope of the appended claims. For example, a great variety of text can be provided on the cards. Similarly, the subject matter on the cards need not be limited to masterpieces, nor to paintings, but can instead include a variety of visually presented subject matter.

What is claimed is:

1. A method of organizing images depicting artworks for encouraging an understanding of visual art, said method comprising:

imprinting one of said images onto separate cards;

for each of said cards said method further comprises:

positioning said one of said images on a first side of said each card;

positioning an information set pertaining to said one of said images on a second side of said each card; and marking said card with stylized brushstrokes representing an art movement into which one of said artworks depicted by said image is categorized, said marking operation includes locating said stylized brushstrokes about a perimeter of each of said one of said images and said information set; and providing a set of said cards, each of said cards of said set having a different one of said images imprinted thereon.

2. A method as claimed in claim 1 further comprising:

generating a color code representing said art movement into which said artwork depicted by said image is categorized; and shading said second side of said each card about said perimeter of said information set with said color code.

3. A method as claimed in claim 1 further comprising:

including icons on said second side, said icons providing facts about an artist of said artwork.

4. A method as claimed in claim 1 further comprising including text describing an artist of said artwork.

5. A method as claimed in claim 1 wherein:

said method further comprises:

imprinting a trapezoidal text block onto said second side of said each card;

imprinting circular images at each corner of said trapezoidal text block; and said positioning activity positions said information set within said trapezoidal text block.

6. A method as claimed in claim 1 wherein said marking activity marks said stylized brushstrokes in a frame about said perimeter.

7. A method as claimed in claim 3 wherein said including activity includes an icon representing a medium with which said artist typically worked.

8. A method as claimed in claim 3 wherein said including activity includes an icon representing a training technique used by said artist.

9. A method as claimed in claim 3 wherein said including activity includes an icon representing an age of said artist when said artwork was generated.

10. A method as claimed in claim 3 wherein said including activity includes an icon representing an art style for which said artist was known.

11. A system for encouraging an understanding of visual art comprising:

a set of cards, each of said cards including:

a first side upon which an image of an artwork is imprinted;

a second side having a placard section, said placard section including an information set pertaining to said artwork; and stylized brushstrokes representing an art movement into which said artwork is categorized, said stylized brushstrokes being located about a perimeter of each of said image and said placard section.

* * * * *